United States Patent [19]

Kojima et al.

[11] Patent Number: 5,506,892
[45] Date of Patent: Apr. 9, 1996

[54] SYSTEM FOR PERFORMING AT LEAST ONE OF A CHECKING AND ADJUSTING OPERATIONS FOR ELECTRONIC EQUIPMENT USING A TELEPHONE

[75] Inventors: Takashi Kojima; Kazuyuki Ogawa, both of Kanagawa, Japan

[73] Assignee: Sony Corporation, Tokyo, Japan

[21] Appl. No.: 214,429

[22] Filed: Mar. 18, 1994

[30] Foreign Application Priority Data

Mar. 25, 1993 [JP] Japan .................... 5-090884

[51] Int. Cl.⁶ ............................ H04M 11/00
[52] U.S. Cl. .................. 379/102; 379/104; 379/105; 379/97; 379/99
[58] Field of Search .................... 379/104, 105, 379/102, 97, 98, 99, 93, 90, 110

[56] References Cited

U.S. PATENT DOCUMENTS

| | | | |
|---|---|---|---|
| 4,540,851 | 9/1985 | Hashimoto | 379/105 |
| 4,841,562 | 6/1989 | Lem | 379/104 |
| 4,872,195 | 10/1989 | Leonard | 379/104 |
| 4,899,370 | 3/1990 | Kameo et al. | 379/104 |
| 4,996,703 | 2/1991 | Gray | 379/104 |
| 5,001,746 | 3/1991 | Nishijima | 379/99 |
| 5,119,412 | 6/1992 | Attallah | 379/104 |
| 5,216,228 | 6/1993 | Hashimoto | 379/102 |

FOREIGN PATENT DOCUMENTS

| | | |
|---|---|---|
| 186468 | 7/1986 | European Pat. Off. |
| 2229022 | 9/1990 | United Kingdom. |
| WO90/08442 | 7/1990 | WIPO. |

OTHER PUBLICATIONS

Patent Abstracts of Japan, vol. 17, No. 70, Feb. 12, 1993 corres. to Japanese Appln. JP-A-4276342 (Koji).
Patent Abstracts of Japan, vol. 8, No. 63, Mar. 24, 1984 corres. to Japanese Appln. JP-A-58213557 (Hashimoto).
"Research Disclosure" No. 329 dated Sep. 1991 of Emsworth.

*Primary Examiner*—Curtis Kuntz
*Assistant Examiner*—Stella L. Woo
*Attorney, Agent, or Firm*—Jay H. Maioli

[57] ABSTRACT

In order to achieve check and adjustment of electronic apparatus such as a VTR from a remote location, a tone dialer in a service company converts commands and data into tone signals for checking and adjusting a VTR in a user's house, which tone signals are transmitted by a telephone over a telephone line and input to a telephone in the user's house. The tone signals received by the user's telephone are converted into the commands and data by a gateway and input to the VTR.

16 Claims, 13 Drawing Sheets

USER'S HOUSE

SERVICE COMPANY

FIG. 4(a)

| LANC DATA (HEXADECIMAL NUMBER) | 1 | 2 | 3 | 4 | 5 | 6 | 7 | 8 | 9 | A | B | C | D | E | F | 0 |
|---|---|---|---|---|---|---|---|---|---|---|---|---|---|---|---|---|
| SYMBOL (KEY) | 1 | 2 | 3 | 4 | 5 | 6 | 7 | 8 | 9 | 0 | * | # | A | B | C | D |
| TONE FREQUENCY (LOW) | 697 | 697 | 697 | 770 | 770 | 770 | 852 | 852 | 852 | 941 | 941 | 941 | 697 | 770 | 852 | 941 |
| TONE FREQUENCY (HIGH) | 1209 | 1336 | 1477 | 1209 | 1336 | 1477 | 1209 | 1336 | 1477 | 1336 | 1209 | 1477 | 1633 | 1633 | 1633 | 1633 |
| TONE RECEIVER OUTPUT Q1 | — | O | O | O | — | O | — | O | — | O | — | O | — | O | — | O |
| TONE RECEIVER OUTPUT Q2 | O | — | — | — | O | — | — | O | O | — | — | O | O | — | — | O |
| TONE RECEIVER OUTPUT Q3 | O | O | O | O | — | — | — | O | O | O | O | — | — | — | — | O |
| TONE RECEIVER OUTPUT Q4 | O | O | O | O | O | O | O | — | — | — | — | — | — | — | — | O |

FIG. 4(b)

| 1 | 2 | 3 | A |
|---|---|---|---|
| 4 | 5 | 6 | B |
| 7 | 8 | 9 | C |
| * | 0 | # | D |

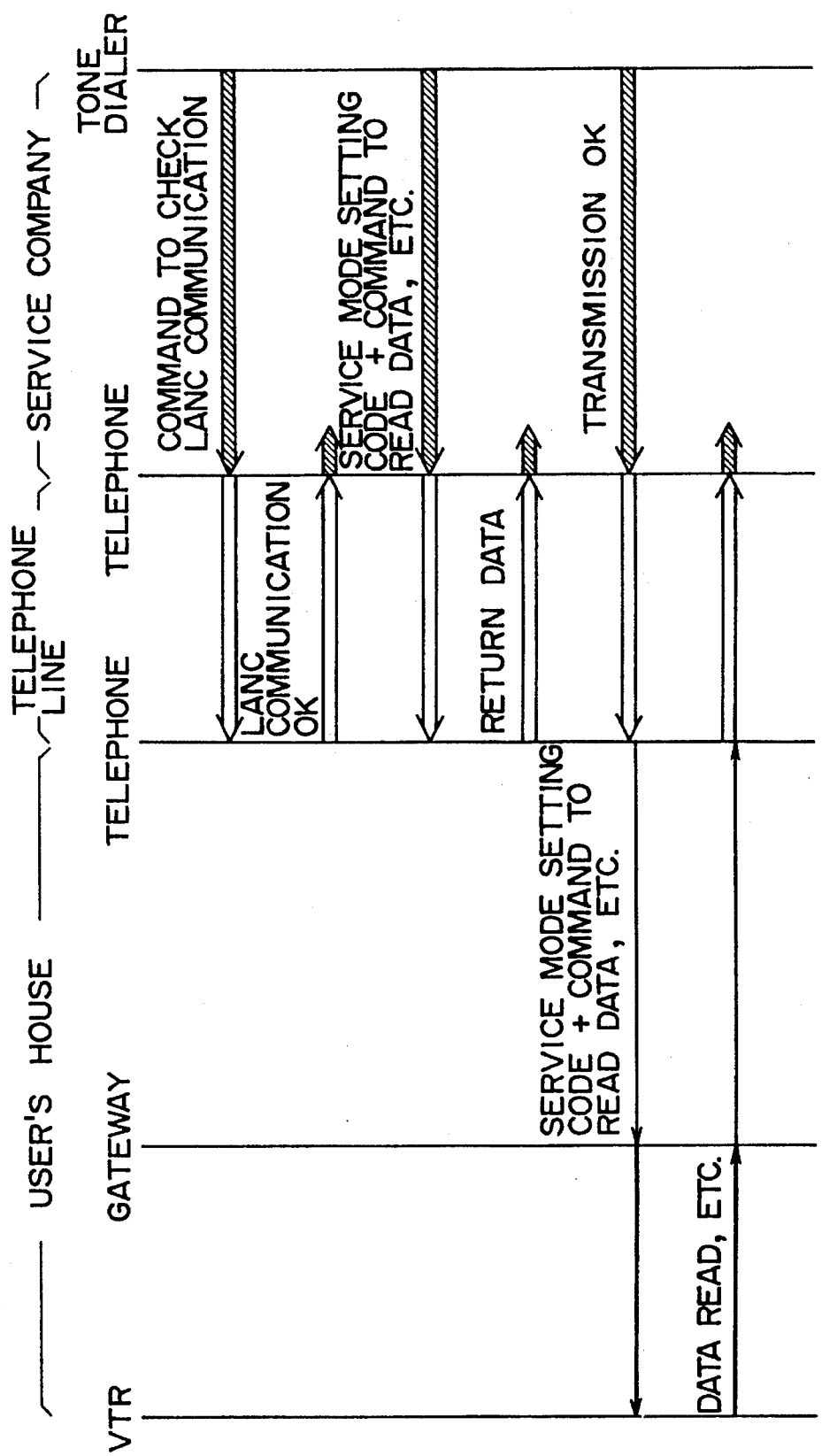

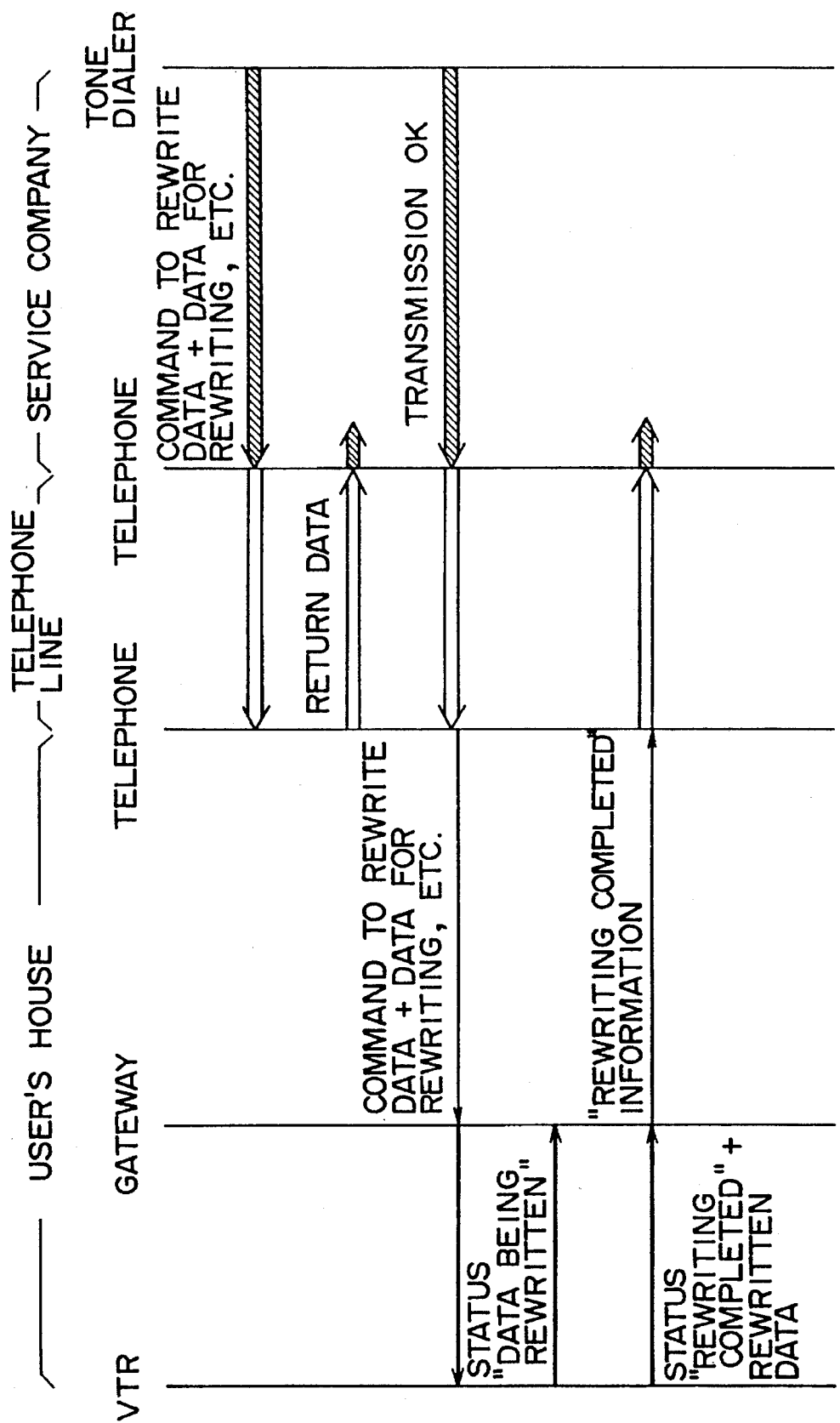

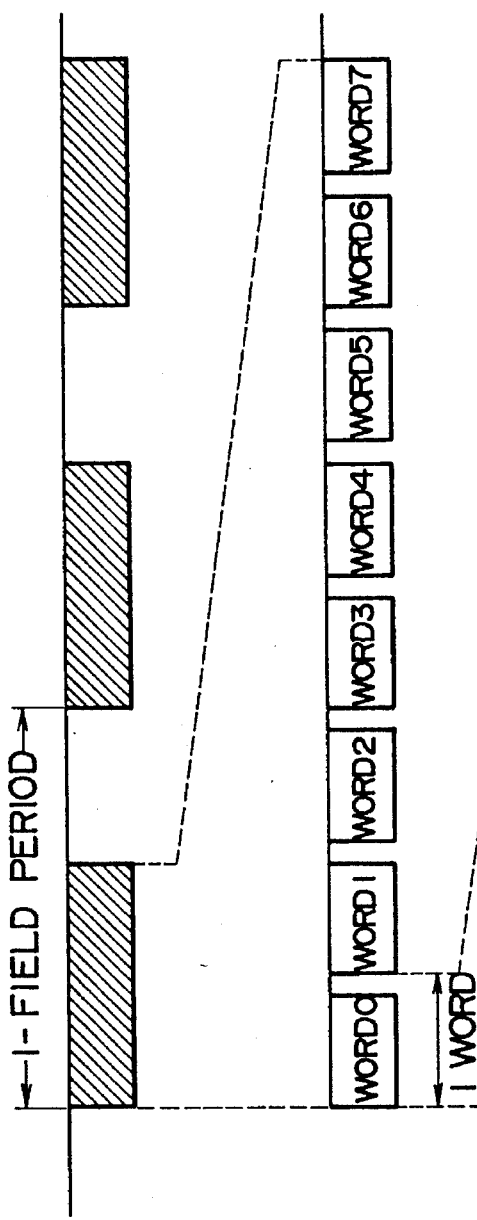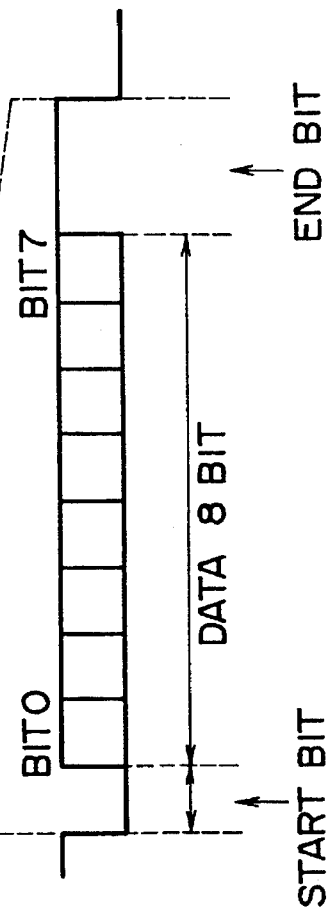
FIG. 13(a)
FIG. 13(b)
FIG. 13(c)
FIG. 13(d)

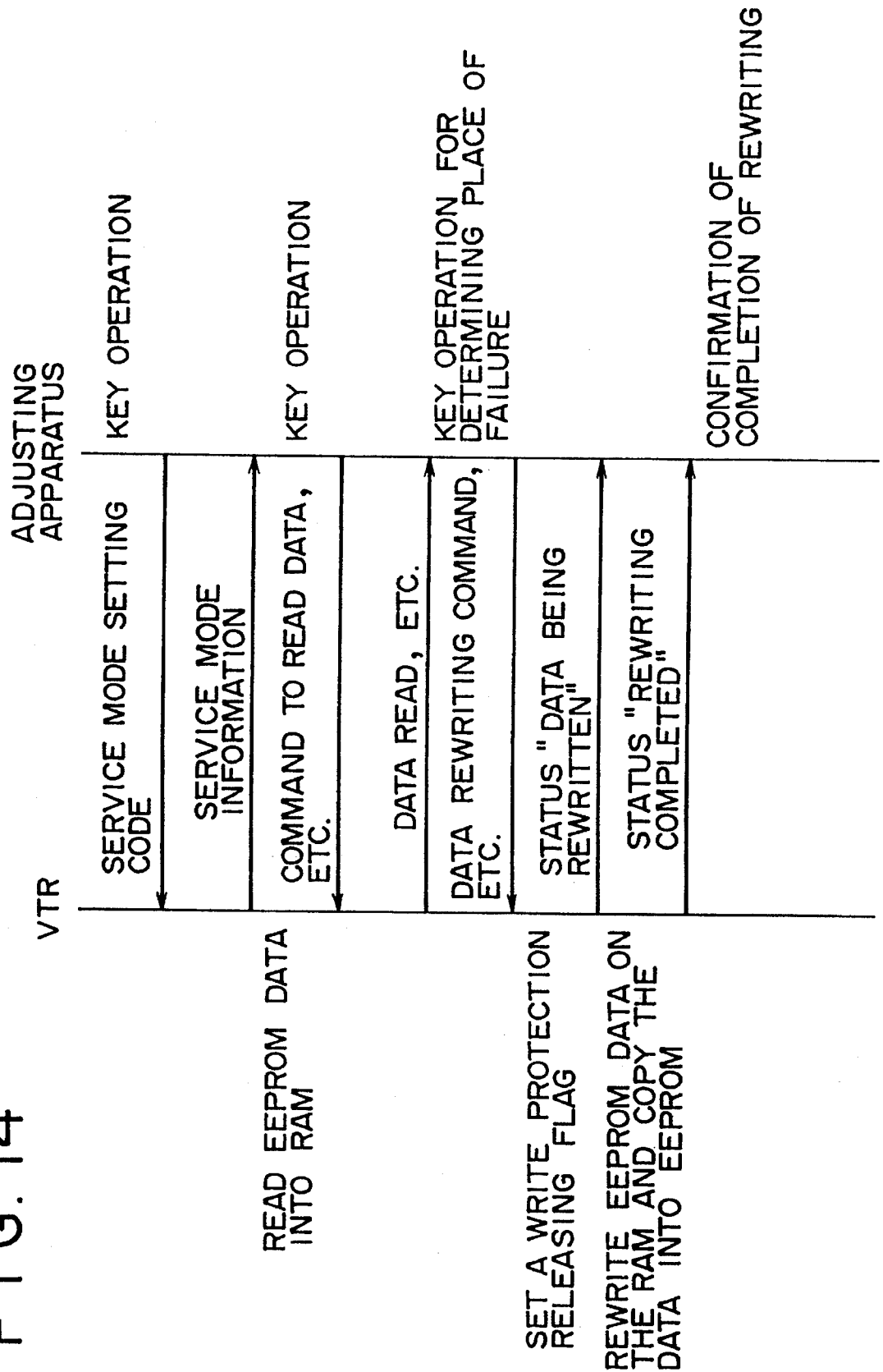

SYSTEM FOR PERFORMING AT LEAST ONE OF A CHECKING AND ADJUSTING OPERATIONS FOR ELECTRONIC EQUIPMENT USING A TELEPHONE

BACKGROUND OF THE INVENTION

1. Field of the Invention

The present invention relates to a system in which a telephone line is used for checking an electronic apparatus and performing repair, adjustment, and the like thereof from a remote location.

2. Description of the Related Art

One system controlling electronic apparatus such as a VTR, has been disclosed in the gazette of EP 0,467,305, A1.

This system is called LANC (Local Application Control Bus System) and in this system electronic apparatus such as a VTR, a single-unit video camera-recorder, or tuner is controlled by peripheral equipment such as an edit controller or a remote controller. The system, by setting an electronic apparatus in a service mode, can detect a failure in the electronic apparatus and adjust it. Below will be described a checking and/or adjusting system for electronic apparatus using the LANC with reference to FIG. 12 to FIG. 14.

In a checking and/or adjusting system for electronic apparatus shown in FIG. 12, reference numeral denotes a VTR as an electronic apparatus to be checked and adjusted, 12 denotes an adjusting apparatus for making the check and adjustment, and 4 denotes a LANC cable.

The VTR 1 comprises a microcomputer 11, a signal processor 12, an EEPROM 13, and an input/output interface 14. The microcomputer 11 has a function to execute system control of the VTR 1. The signal processor 12 is a video signal processor, an audio signal processor, a reception circuit, or the like. The EEPROM 13 stores various data for controlling the signal processor 12, such as white balance setting data, EVR (electronic volume) setting data, receive frequency setting data, and patch correction data of a ROM (not shown) in the microcomputer 11. The input/output interface 14 has a function to make data conversion from serial data on the LANC cable 4 to parallel data of the microcomputer 11 and vice versa.

The adjusting apparatus 12 comprises a microcomputer 121, keys 122, a display 123, and an input/output interface 124. The microcomputer 121 has a function to execute system control of the adjusting apparatus 12. The keys 122 are for inputting various commands and data necessary for the check and adjustment. The display 123 displays commands and data input from the keys 122, responses from the VTR 1, and the like. The input/output interface 124, similarly to the input/output interface 14, has a function to make data conversion from serial data on the LANC cable 4 to parallel data of the microcomputer 121 and vice versa.

FIGS. 13(a)–13(d) show a data format used in the LANC. As shown in this diagram, a set of 8-word data is transmitted in each 1-field period of a video signal. Of the 8 words, word 0 to word 3 are used for transmitting various commands and data from peripheral equipment such as an adjusting apparatus to electronic apparatus such as a VTR, while word 4 to word 7 are used for transmitting statuses and various data of the electronic apparatus from the electronic apparatus such as a VTR to the peripheral equipment such as an adjusting apparatus. Each word is formed of 8 bits and has a start bit and a stop bit inserted at its beginning and end, respectively.

Referring now to FIG. 14, a procedure to rewrite data stored in the EEPROM 13 within the VTR 1 in the checking and/or adjusting system for electronic apparatus arranged as described above will be described.

First, the VTR 1 and the signal processor 12 are linked via a LANC cable 4. Then, the keys 122 of the adjusting apparatus 12 are operated to set a code for setting the mode to the service mode, a command to read data stored in the EEPROM 13, and the location to be read (page, address, etc.) in the words 0 to 3 shown in FIGS. 13(a)–13(d). These code, command, data, and the like are successively transmitted to the VTR 1. Upon receipt of the code to set the mode to the service mode, the VTR 1 sets information indicating that the mode has been set in the service mode to the word 4 and, at the same time, reads the data stored in the EEPROM 13 into a RAM (not shown) within the microcomputer 11. Further, upon receipt of the command to read the data and the information indicating the location to be read, the VTR 1 reads the data corresponding to the location from the RAM and sets the data read and the location read (page, address, etc.) in the words 5 to 7. Such mode information, data read, and the like are successively transmitted to the adjusting apparatus 12. The adjusting apparatus 12, receiving such transmitted data and the like and checking the contents, can determine the position of failure. The setting of the position to be read for determination of the position of failure may be made manually by a serviceman or automatically by a program in the microcomputer 121.

When the position of failure is determined as described above, then, the keys 122 are operated so that a command to rewrite the content of the EEPROM 13, the location (page, address, etc.) of the EEPROM 13 where the content is to be rewritten, and the data for rewriting (these will hereinafter be called the data rewriting command etc.) are set in the word 1 to word 3. The data rewriting command etc. are successively transmitted to the VTR 1. The microcomputer 11 of the VTR 1, upon receipt of the command to rewrite the content of the EEPROM 13, sets a write protection releasing flag. When it receives the data for rewriting etc., it rewrites data on the RAM and copies the data into the EEPROM 13. While the data are being rewritten, it sets a status indicating that data are being rewritten in the word 5, and when the rewriting is completed, it sets a status indicating that the rewriting is completed. In the words 6 and 7, there are set the data on the RAM, hence, the data etc. rewritten when the rewriting has been completed. The adjusting apparatus 12 receives the status indicating completion of the rewriting and displays it on the display 123. Therefore, the serviceman can confirm that the content of the EEPROM 13 corresponding to the position of failure is rewritten.

While, for convenience, it is shown in FIG. 14 such that the adjusting apparatus 12 transmits the service mode setting code, command to read data, data rewriting command etc., separately, one after another, in reality, for example once the service mode setting code is set in the word 0, all of them are transmitted to the VTR 1 every field as shown in FIGS. 13(a)–13(d). Alternatively, the command to read data and the like can be transmitted during the period of the field for transmitting the service mode setting code at the start.

In the above described checking and/or adjusting system of the related art, however, the peripheral equipment for performing the check and adjustment and the electronic apparatus as the object of the check and adjustment are directly linked through a LANC cable and the electronic apparatus is checked and adjusted by having commands and data transmitted and received between them. Hence, there has been a problem that it is impossible to perform the check and adjustment from a remote location. Accordingly, when the electronic apparatus gets out of order, it has been necessary for the user to take it to a service company or for the serviceman to visit the user's location.

SUMMARY OF THE INVENTION

The present invention has been made to overcome the above mentioned difficulty. Accordingly, it is an object of the present invention to provide a checking and/or adjusting system for electronic apparatus in which it is made possible to check and adjust an electronic apparatus from a remote location.

In order to solve the above mentioned problem, the present invention, in a system performing check and adjustment of electronic apparatus by inputting an external control signal to an electronic apparatus, thereby causing it to read and rewrite data stored in its nonvolatile storage means, is arranged to have means for generating a tone signal corresponding to a control signal, means for transmitting the tone signal over a telephone line, and means for receiving a tone signal input from the telephone line installed in a first location, and means for receiving the tone signal transmitted over the telephone line, converting it into the control signal, and inputting the control signal to the electronic apparatus and means for converting data output from the electronic apparatus into a tone signal and transmitting the tone signal over the telephone line installed in a second location.

In the described arrangement, the means for generating a tone signal installed in the first location is adapted to generate for example a sound of a tone signal corresponding to the control signal and convert this sound into a tone signal by means of the microphone of a telephone. The same may also be adapted to generate a digital signal corresponding to the control signal and input the digital signal to a dialer of a telephone so that a tone signal is generated thereby.

Further, the inputting of the control signal to the electronic apparatus and reading of data therefrom are repeatedly performed in synchronism with the vertical synchronizing signal of a video signal.

According to the present invention, a tone signal corresponding to a control signal for checking and adjusting an electronic apparatus is generated in a first location and the generated signal is transmitted to a second location over a telephone line. In the second location, the tone signal is converted into the control signal and it is input to the electronic apparatus and, thereby, data in a nonvolatile storage means of the electronic apparatus is read and rewritten. The data read in the second location is converted into a tone signal and the tone signal is transmitted to the first location over the telephone line. In the first location, it is judged that the checking and adjustment of the electronic apparatus are completed on the basis of the received tone signal.

Since the inputting of the control signal to the electronic apparatus and reading of data therefrom are repeatedly performed in synchronism with the vertical synchronizing signal of a video signal, inputting and outputting of the control signal and data are ensured to be performed properly.

According to the present invention, as described above, checking and adjustment of an electronic apparatus can be performed from a remote location. Therefore, even when an electronic apparatus gets out of order, neither it is necessary for the user to take the electronic apparatus to a service company nor it is necessary for a serviceman to visit the user's location.

BRIEF DESCRIPTION OF THE DRAWINGS

FIGS. 4(a) and 4(b) are diagrams showing the relative correspondences of LANC data, tone dialer key symbol, tone signal, and tone receiver output in the first embodiment of the invention.

FIG. 5 is one portion of a sequence diagram showing operations in the first embodiment of the invention.

FIG. 6 is the other portion of a sequence diagram showing operations in the first embodiment of the invention.

FIGS. 13(a)–13(d) are diagrams showing a data format used in LANC.

FIG. 14 is a diagram showing a procedure for rewriting data stored in an EEPROM within a VTR.

DETAILED DESCRIPTION OF THE PREFERRED EMBODIMENTS

Below will be given a detailed description of preferred embodiments of the present invention with reference to the accompanying drawings.

First Embodiment

Figure 1:
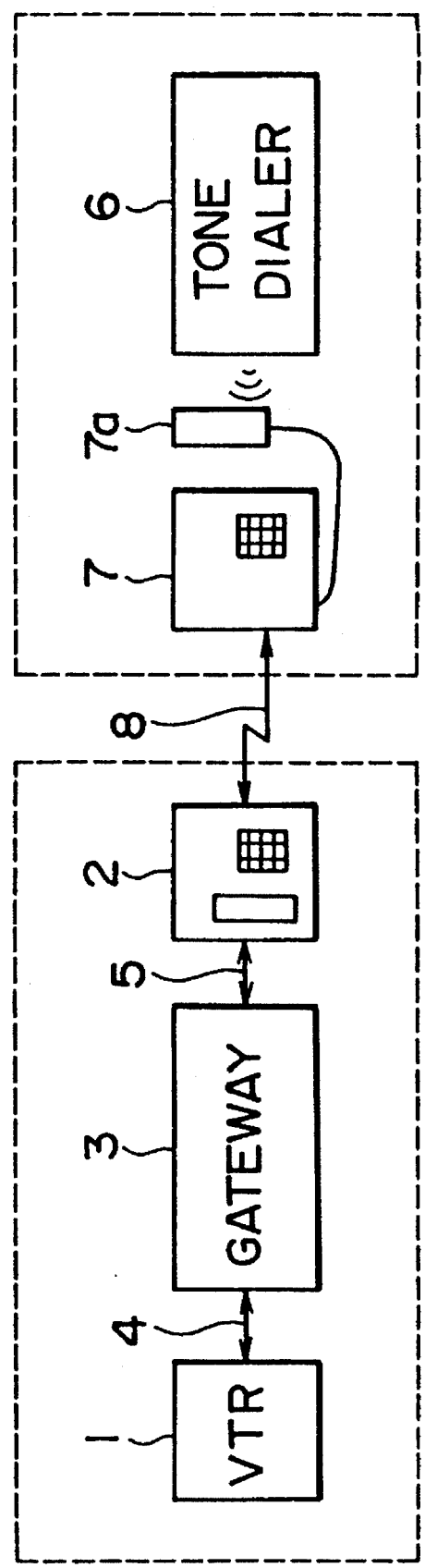
FIG. 1 is a diagram showing the structure of a checking and/or adjusting system for electronic apparatus according to a first embodiment of the invention.
Figure 12:
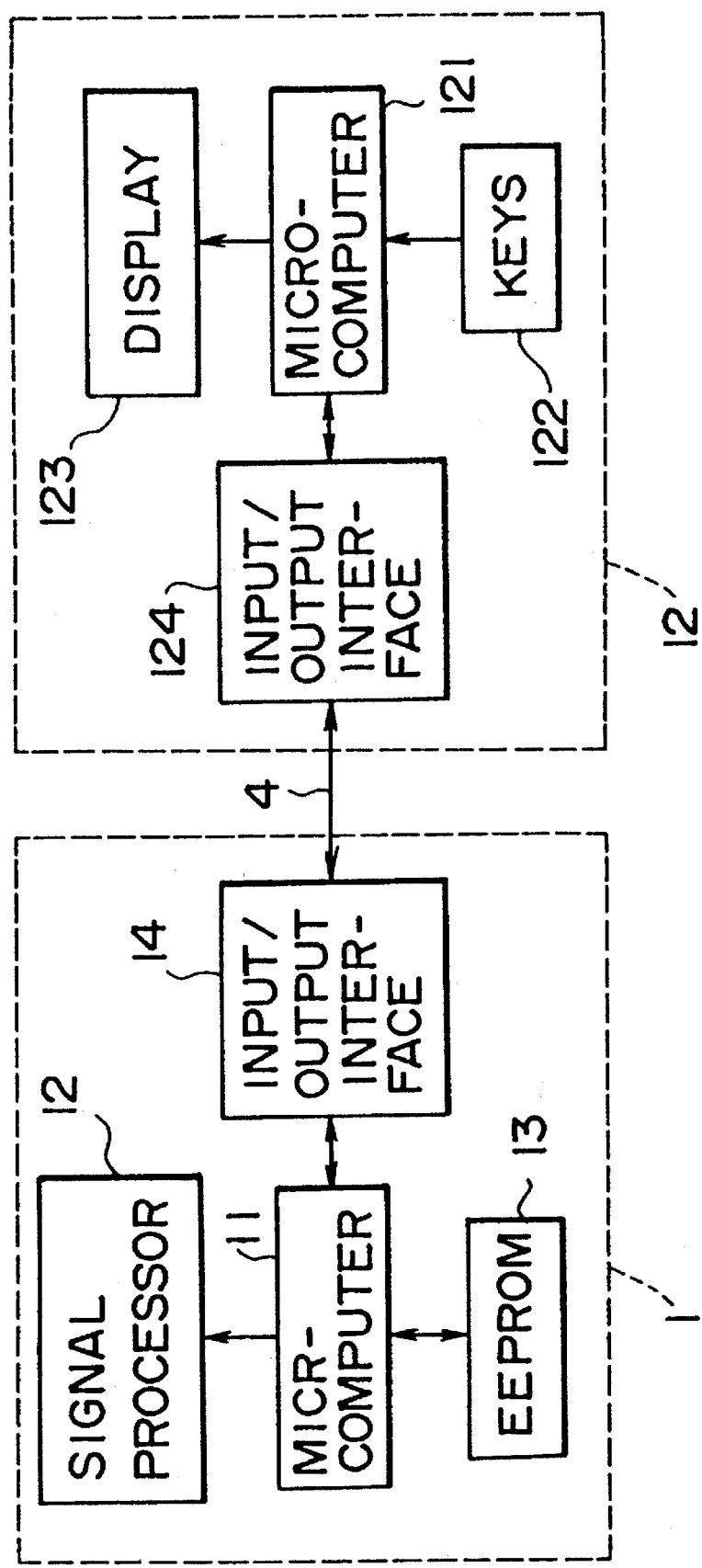
FIG. 12 is a diagram showing the structure of a checking and/or adjusting system for electronic apparatus of a related art.

FIG. 1 is a diagram showing the structure of checking and/or adjusting system for electronic apparatus according to a first embodiment of the invention. Components, here, corresponding to those in FIG. 12 are denoted by the corresponding reference numerals.

In this system, there are installed a telephone with parallel terminal 2 and a gateway 3 in a user's house and a tone dialer 6 in a service company. The telephone with parallel terminal 2 has a function to convert a tone signal from a telephone line 8 into digital data and also convert a digital signal from the gateway 3 into a tone signal. The gateway 3 has a function to convert digital data output from the telephone with parallel terminal 2 into LANC data input to the VTR 1 and also to convert LANC data output from the VTR 1 into digital data input to the telephone with parallel terminal 2. The tone dialer 6 has a function to generate a tone signal according to key operation and outputs it as a sound. Now, referring to FIG. 1, an outline of the procedure to adjust a failure in the VTR 1 will be described.

First, the user gives a call to the service company using the telephone with parallel terminal 2 telling a serviceman that the VTR 1 is out of order and in need of repair. Answering the call, the serviceman of the service company tells the user that he will make the repair and requests the user to connect the telephone with parallel terminal 2, the gateway 3, and the VTR 1. The serviceman then causes the tone dialer 6 to output sounds of tone signals corresponding to various commands and data. These sounds are input to a telephone 7 through a handset 7a and, then, transmitted over the telephone line 8 to be input to the telephone with parallel terminal 2. The tone signals input to the telephone with parallel terminal 2 are converted into digital signals and input, through a parallel communication cable 5, to the gateway 3 to be converted into LANC data therein, and the LANC data are input to the VTR 1 through the LANC cable 4. Upon receipt of these LANC data, the VTR 1 sends out various statuses and the like shown in FIG. 14. These statuses and the like are converted into digital signals by the gateway 3, converted into tone signals by the telephone with parallel terminal 2, input, through the telephone line 8, to the telephone 7 in the service company and output from the handset 7a as sounds. By listening to the sounds, the serviceman identifies the position of failure, and acknowledges completion of the repair and the like. When the repair has been completed, the serviceman informs the user of it using the telephone 7.

Figure 2:
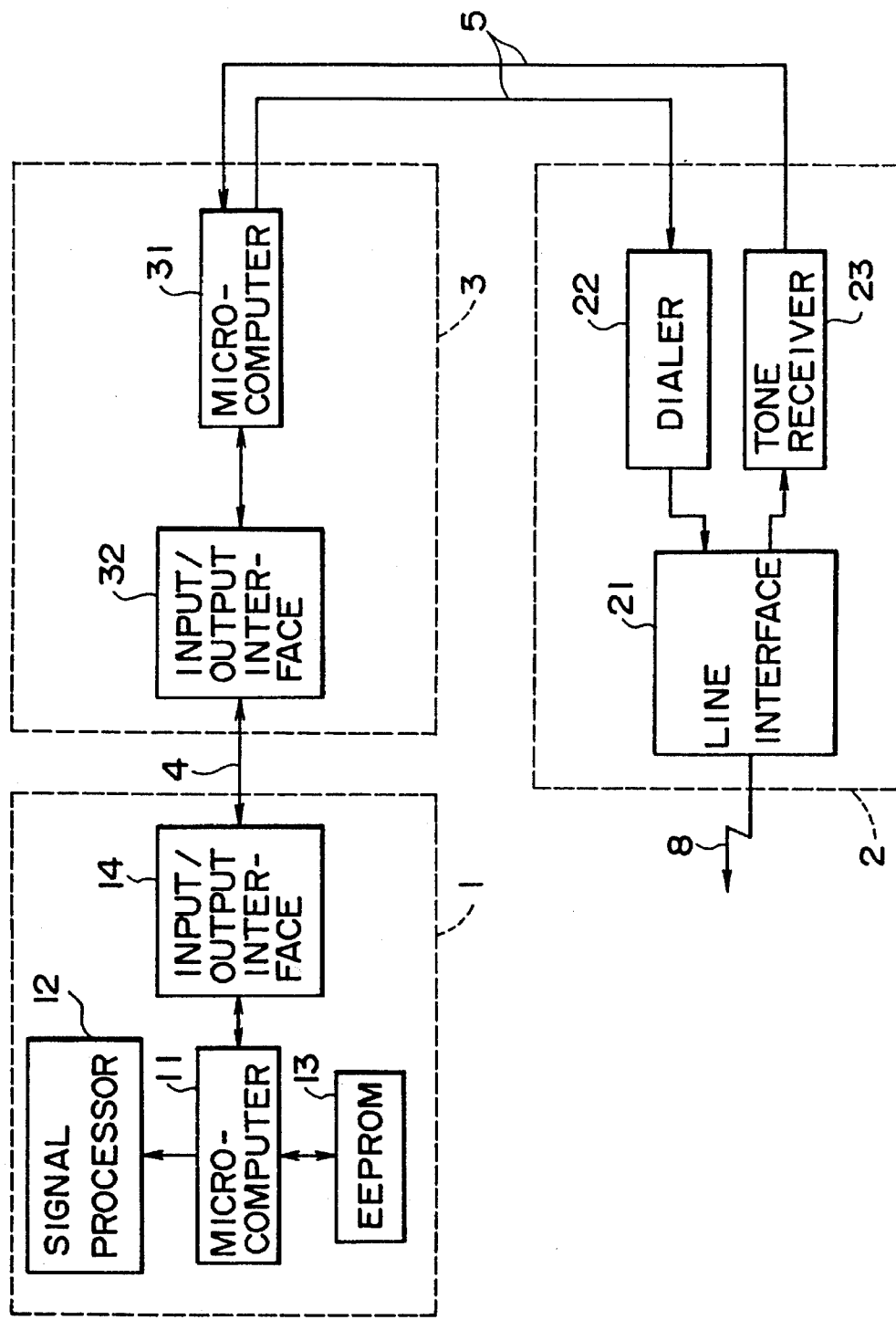
FIG. 2 is a diagram showing the structure of a telephone with a parallel terminal and a gateway in the first embodiment of the invention.

Referring now to FIG. 2, the structure of the telephone with a parallel terminal and the gateway will be described. Components corresponding to those in FIG. 12 are denoted by corresponding reference numerals.

In FIG. 2, the telephone with a parallel terminal 2 comprises an input/output interface (line interface) 21 in connection with the telephone line 8, a dialer 22 generating a tone signal corresponding to a digital signal input from a microcomputer 31 of the gateway 3 or to a digital signal input from keys (not shown) and outputting the tone signal to the line interface 21, and a tone receiver 23 converting a tone signal input from the line interface 21 into a digital signal and outputting the digital signal to the microcomputer 31 of the gateway 3.

The gateway 3 in FIG. 2 comprises the microcomputer 31 and an input/output interface 32 in connection with the LANC cable 4. The microcomputer 31 has a function to convert LANC data output from the input/output interface 32 into digital data to be input to the telephone with parallel terminal 2 and also convert digital data output from the telephone with parallel terminal 2 into LANC data to be input to the input/output interface 32.

Figure 3:
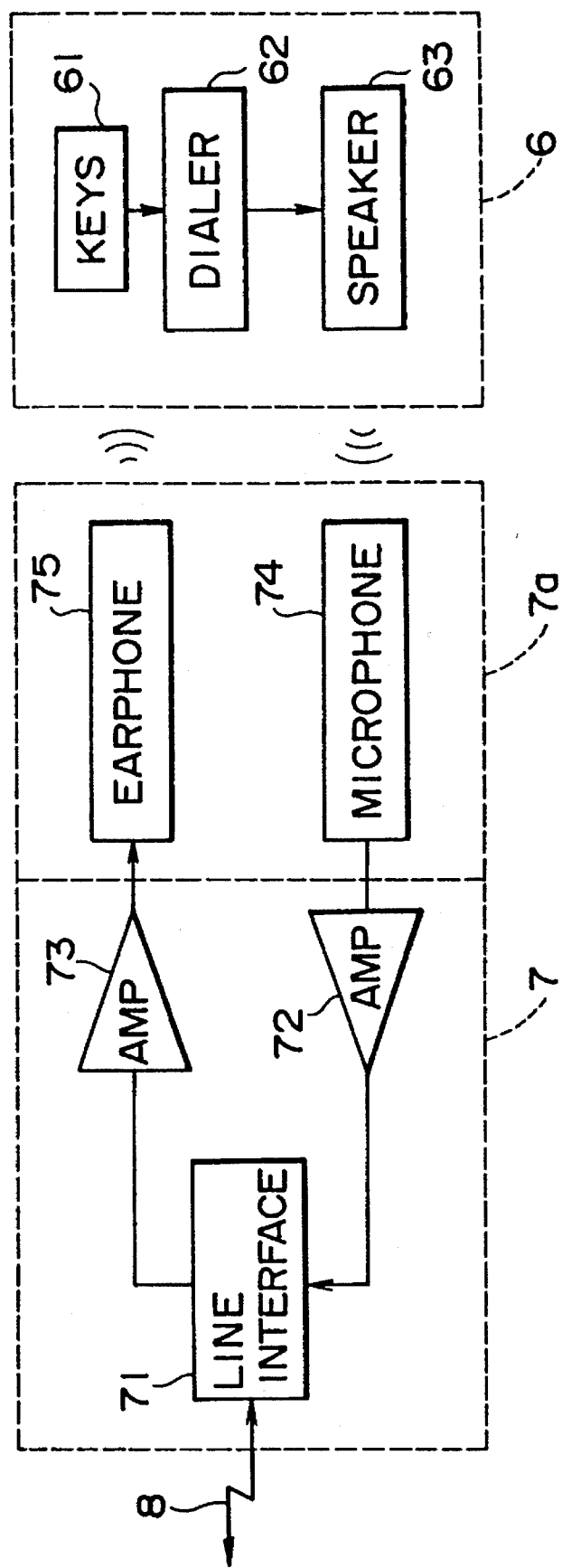
FIG. 3 is a diagram showing the structure of a tone dialer and its coupling with a telephone.

Referring now to FIG. 3, the structure of the tone dialer and its coupling with the telephone will be described. The tone dialer 6 in FIG. 3 comprises keys 61 for specifying tone signals, a dialer 62 for generating the tone signal specified by the keys 61, and a speaker 63 for converting the output of the dialer 62 into a sound. The output of the speaker 63 is converted into an electric signal by a microphone 74 of the handset 7a, amplified by a transmission amplifier 72, and output, through a line interface 71, to the telephone line 8. A tone signal input from the telephone line 8 is amplified by a reception amplifier 73 and output as a sound from an earphone 75.

FIGS. 4(a) and 4(b) are diagrams showing relative correspondences of the LANC data, key symbol of the tone dialer, tone signal, and the output of the tone receiver in the first embodiment of the invention. While the LANC data, as shown in the first row of FIG. 4(a), are constituted of hexadecimal numbers 0 to F, there are only 12 kinds of keys, i.e., 0 to 9, *, and #, for generating tone signals in the telephone communication now in practice. Therefore, these keys alone cannot transmit LANC data by converting them into tone signals. Accordingly, in the tone dialer 6 of the present embodiment, the key arrangement was made with keys A, B, C, and D added to the keys of the telephone as shown in FIG. 4(b). Further, the High and Low frequencies for the tone signal corresponding to each key were set as shown in the second to fourth rows of FIG. 4(a). As a result, it has become possible to specify 16 kinds of tone signals with the keys 61 and, thus, it has become possible to convert LANC data into tone signals and transmit them over the telephone line. For example, when the LANC data desired to be transmitted is FF0F3342, keys CCDC3342 may be input.

FIG. 5 and FIG. 6 are diagrams showing a sequence of operations in the first embodiment of the invention. Referring to FIG. 5 and FIG. 6, the thick line shadowed with oblique lines indicates the sound of a tone signal, the hollow thick line indicates telephone communication, the thin full line indicates data communication between the gateway and the telephone, and the thick full line indicates LANC communication. The procedure to rewrite data stored in the EEPROM 13 within the VTR 1 in the first embodiment of the invention will be described below with reference to FIG. 2 to FIG. 6.

Now, we assume that the user gave a call to the service company and then connected the telephone with parallel terminal 2, the gateway 3, and the VTR 1 as described above referring to FIG. 1.

First, the service company, in order to check whether the LANC communication between the gateway 3 and the VTR 1 in the user's house is normal, generates a predetermined tone signal by operating the keys 61 of the tone dialer 6, converts the tone signal into a sound by means of the speaker 63, and outputs the sound. This sound is converted into a tone signal by the microphone 74 of the handset 7a and the tone signal is transmitted over the telephone line 8 through the line interface 71 and input to the telephone with a parallel terminal 2 in the user's house.

The tone signal input to the telephone with parallel terminal 2 is input to the tone receiver 23 through the line interface 21 and, therein, converted into a 4-bit parallel digital signal as indicated by Q1 to Q4 in FIG. 4(a) and the digital signal is transmitted over the parallel communication cable 5 and input to the gateway 3.

The microcomputer 31 in the gateway 3 receives the digital signal, judges it to be the command to check the LANC communication, and checks whether its LANC communication with the VTR 1 is normal. This check is performed in the following way: when there is normal LANC communication between the VTR 1 and the gateway 3, a flag is set in the microcomputer 11 of the VTR 1 and the microcomputer 11 sets a corresponding status in the word 1 of the LANC communication data; since this status is input to the gateway 3 through the LANC cable 4, the microcomputer 31 can confirm whether or not the LANC communication is normal according to the presence or absence of the status.

The microcomputer 31 generates different 8-bit digital signals according to whether the LANC communication is normal and transmits either digital signal which is relevant to the telephone with a parallel terminal 2 through the parallel communication cable 5. This digital signal is converted by the dialer 22 into a tone signal corresponding to the digital signal and the tone signal is transmitted over the telephone line 8 through the line interface 21. The tone signal is input to the earphone 75 through the line interface 71 of the telephone 7 and, therein, it is converted to a sound and output therefrom. The serviceman, identifying the sound, acknowledges whether the LANC communication is normal. If it is normal, the following step is processed, but if it is not normal, the checking operation is repeated until the LANC communication becomes normal (FIG. 5 shows the case where the LANC communication is normal (OK)).

When it is confirmed that the LANC communication is normal in the described manner, then, the same as in FIG. 14, tone signals corresponding to the code setting the VTR 1 in the service mode, the command to read data from the EEPROM 13, and the location (page, address, etc.) to be read are transmitted. These tone signals corresponding to the codes, commands, and the like are converted into tone signals in the telephone 7 and these tone signals are transmitted over the telephone line 8 and input to the telephone with parallel terminal 2.

In the telephone with parallel terminal 2, the tone signal is converted by the tone receiver 23 into a 4-bit digital signal and transmitted to the microcomputer 31 of the gateway 3. The microcomputer 31 stores the digital signal in its RAM (not shown) and, on the other hand, converts it into an 8-bit digital signal and sends it back to the telephone with parallel terminal 2. The digital signal sent back to the telephone with parallel terminal 2 is converted by the dialer 22 into a tone signal and returned to the telephone 7 through the telephone line 8.

In the telephone 7, the received tone signal is converted by the earphone 75 into a sound and output therefrom. The serviceman, when the sound of the transmitted tone signal and the sound of the returned tone signal are in agreement, judges that the codes, commands, and the like are transmitted correctly, and the following step is processed. However, when the sound of the transmitted tone signal and the sound of the returned tone signal are not in agreement, the above described step to check whether the LANC communication is normal is processed again.

When the transmitted codes, commands, and the like and the returned codes, commands, and the like are confirmed to be in agreement with each other in the described manner, then, a tone signal corresponding to a command permitting the already transmitted codes, commands, and the like to be transmitted to the VTR 1 is transmitted. This tone signal is transmitted, through the telephone 7, over the telephone line 8 and input to the telephone with parallel terminal 2 and, therein, the tone signal is converted into a 4-bit digital signal to be input to the gateway 3. Upon receipt of the digital signal, the gateway 3 converts the codes, commands, and the like already received and stored in the RAM into LANC data and transmits them to the VTR 1.

The VTR 1, upon receipt of these codes, commands, and the like, sets the information that it is set to the service mode in the word 4, the same as in the case of FIG. 14, and, at the same time, reads data stored in the EEPROM 13 into the RAM of the microcomputer 11. Further, it reads the data from the RAM and sets the location read (page, address, etc.) and the data read in the word 5 to word 7. These mode information, data read, and the like are successively transmitted to the gateway 3. The gateway 3, receiving these data and the like thus transmitted thereto, converts them into 8-bit digital signals, and transmits these signals to the telephone with parallel terminal 2. These digital signals are converted by the dialer 22 into tone signals and transmitted to the telephone 7 through the telephone line 8. The telephone 7 converts the received tone signals into sounds and outputs them from the earphone 75. The serviceman can thus determine the position of failure by identifying the sounds.

The above described sequence of communications is shown in FIG. 5. When the position of failure is determined in the described manner, then, the tone dialer 6 outputs tone signals corresponding to the data rewriting command etc. for rewriting the data in the EEPROM 13. The tone signals corresponding to the data rewriting command etc. are sent back after being received by the gateway 3, as with the earlier transmitted tone signals corresponding to the code for setting the electronic apparatus 1 in the service mode, the command to read data from the EEPROM 13, and the location (page, address, etc.) to be read. When the signals sent back are in agreement with those transmitted, then, a tone signal corresponding to the command permitting the data rewriting command etc. to be transmitted to the VTR 1 is transmitted. The gateway 3, upon receipt of this command, converts the data rewriting command etc. into LANC data and transmits them to the VTR 1. When the transmitted tone signals and the sent back tone signals are not in agreement, the signals are transmitted again.

The microcomputer 11 of the VTR 1 sets a flag releasing the write protection the same as in the case of FIG. 14. Further, it rewrites the data on the RAM and copies them into the EEPROM 13. It, while rewriting the data, sets a status indicating that data are being rewritten in the word 5, and when the rewriting has been completed, it sets a status indicating that the rewriting is completed. In the word 6 and word 7, there are set the data on the RAM, that is, rewritten data and the like when the rewriting has been completed. The gateway 3 receives such status and data, and compares the transmitted rewriting data etc. with the received rewritten data. If they are in agreement, it transmits a digital signal indicating the agreement to the telephone with a parallel terminal 2. The telephone with a parallel terminal 2 converts this digital signal into a tone signal and transmits it to the telephone 7. The telephone 7 converts the received tone signal into a sound and outputs it from the earphone 75. The serviceman identifies the sound and thereby confirms that the rewriting of the EEPROM 13 is completed. He then informs the user of the completion of the repair using the telephone 7.

Second Embodiment

Figure 7:
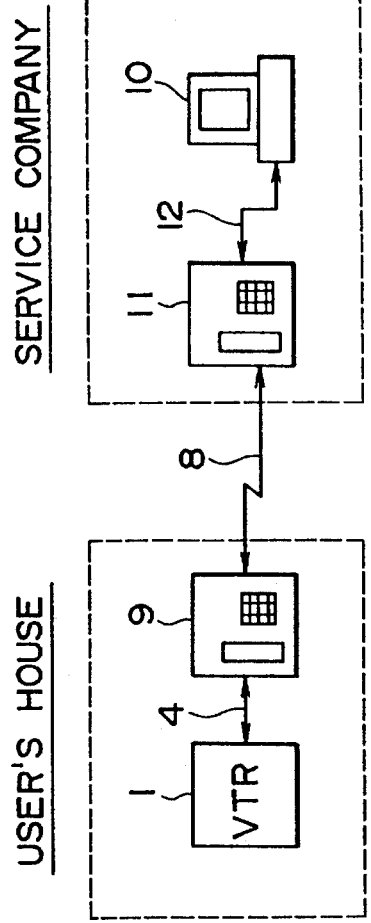
FIG. 7 is a diagram showing the structure of a checking and/or adjusting system for electronic apparatus according to a second embodiment of the invention.

FIG. 7 is a diagram showing the structure of a checking and/or adjusting system for electronic apparatus according to a second embodiment of the invention. In the following drawings, components corresponding to those in the first embodiment are denoted by corresponding reference numerals.

In this system, there are installed a telephone with a LANC terminal 9 in the user's house and a controller 10 such as a personal computer and a telephone with controller terminal 11 in the service company. The telephone with a LANC terminal 9 has, in addition to the function which an ordinary telephone has, a function to make data conversion from LANC data to a tone signal and vice versa, i.e., the function of the gateway in the first embodiment. The telephone with controller terminal 11 has, in addition to the function which an ordinary telephone has, a function to make data conversion from data of the controller to a tone signal and vice versa. An outline of a procedure to repair a fault in the VTR 1 will be described below with reference to FIG. 7.

First, the user gives a call to the service company using the telephone with a LANC terminal 9 telling a serviceman that the VTR 1 is out of order and in need of repair. Answering the call, the serviceman of the service company tells the user that he will make the repair and requests the user to link the telephone with LANC terminal 9 and the VTR 1 via the LANC cable 4. The serviceman then causes the controller 10 to deliver various commands, data, and the like. These commands, data, and the like are converted into tone signals by the telephone with controller terminal 11 and these signals are input, through the telephone line 8, to the telephone with a LANC terminal 9 in the user's house. Therein, the tone signals are converted into LANC data and input to the VTR 1 through the LANC cable 4. Upon receipt of these commands and the like, the VTR 1 sends out various statuses and the like shown in FIG. 14. These statuses and the like are converted into tone signals by the telephone with a LANC terminal 9 and these tone signals are input, through the telephone line 8, to the telephone with controller terminal 11 in the service company. Therein, the tone signals are converted into data of the personal computer to be, then, input to the controller 10 through the serial communication cable 12. When the repair has been completed, the serviceman informs the user of it using the telephone with controller terminal 11.

Figure 8:
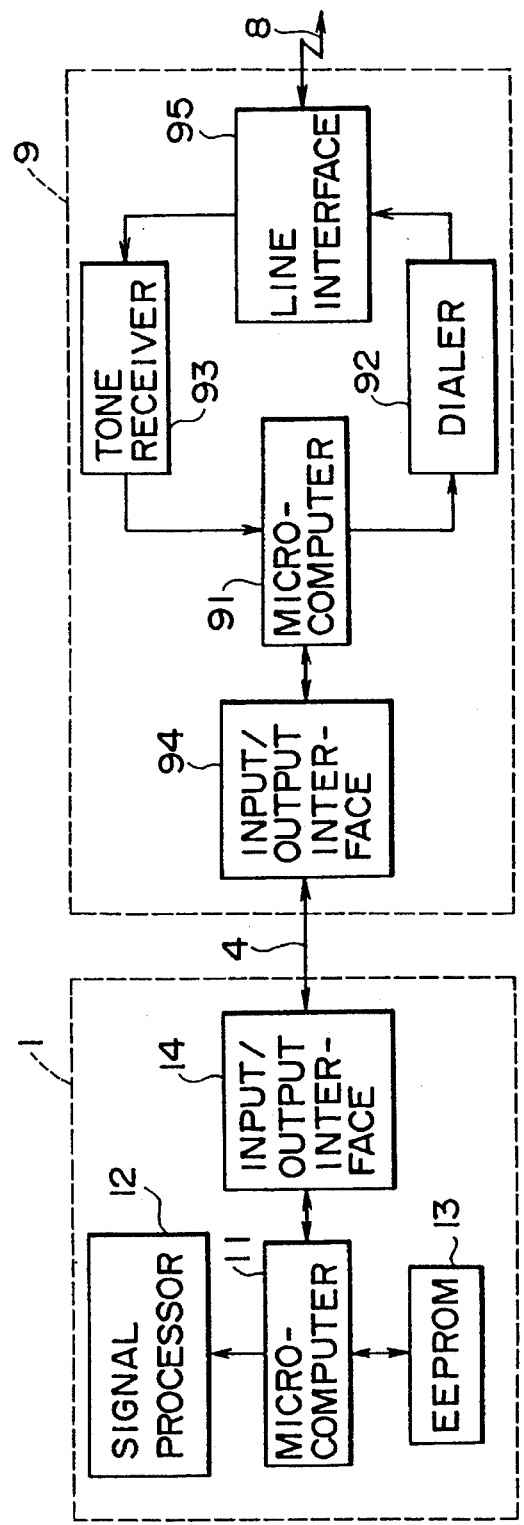
FIG. 8 is a diagram showing the structure of a telephone with LANC terminal and its connections with a VTR and a telephone line in the second embodiment of the invention.

Referring now to FIG. 8, structure of the telephone with a LANC terminal and its connections with the VTR and the telephone line will be described. The telephone with a LANC terminal 9 comprises a microcomputer 91 for executing the overall system control of the telephone, a dialer 92 for converting the output of the keys (not shown) or the output of the microcomputer 91 into a tone signal, a tone receiver 93 for converting a tone signal into a 4-bit digital signal, an input/output interface 94 to make data conversion from the output data of the microcomputer 91 to a serial signal for LANC communication and vice versa, and an interface (line interface) 95 in connection with the telephone line 8.

Figure 9:
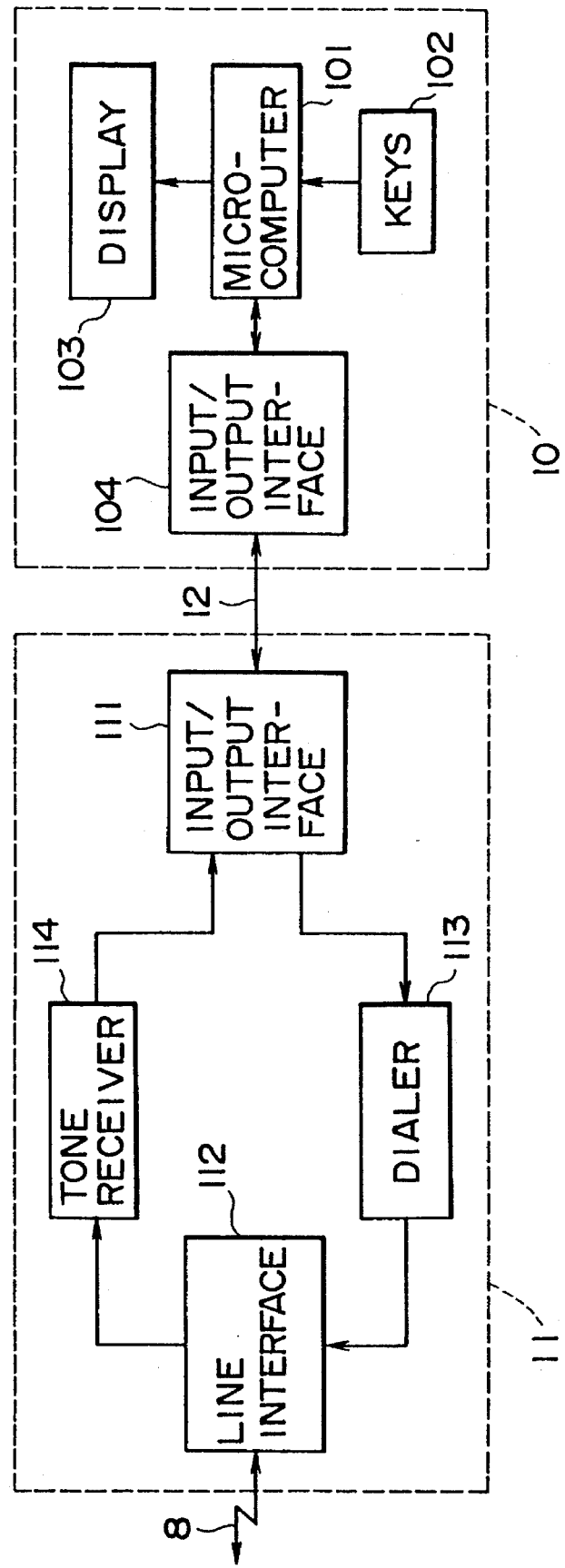
FIG. 9 is a diagram showing the structure of a telephone with controller terminal and its connections with a controller and a telephone line in the second embodiment of the invention.

Referring now to FIG. 9, the structure of the telephone with controller terminal 11 and its connections with the controller and the telephone line will be described. The telephone with controller terminal 11 comprises an input/output interface 111 in connection with the serial communication cable 12, an input/output interface (line interface) 112 in connection with the telephone line 8, a dialer 113 generating a tone signal corresponding to a digital signal input from the input/output interface 111 or a digital signal input from the keys (not shown) and outputting the tone signal to the line interface 112, and a tone receiver 114 converting a tone signal input from the line interface 112 into a digital signal and outputting the digital signal to the input/output interface 111.

The controller 10 comprises a microcomputer 101, keys 102, a display 103, and an input/output interface 104. The microcomputer 101 has a function to execute system control of the controller 10. The keys 102 are for inputting various commands and data necessary for the check and adjustment, and the display 103 is for displaying commands and data input from the keys 102 and responses from the VTR 1 and the like. The input/output interface 104 has a function to make data conversion from the serial data on the serial communication cable 12 to parallel data of the microcomputer 101 and vice versa.

It is also possible to link the controller 10 and the telephone with controller terminal 11 via a parallel communication cable and make an arrangement such that parallel data from the microcomputer 101 is transmitted to the dialer 113 and parallel data from the tone receiver 114 is received by the microcomputer 101.

Figure 10:
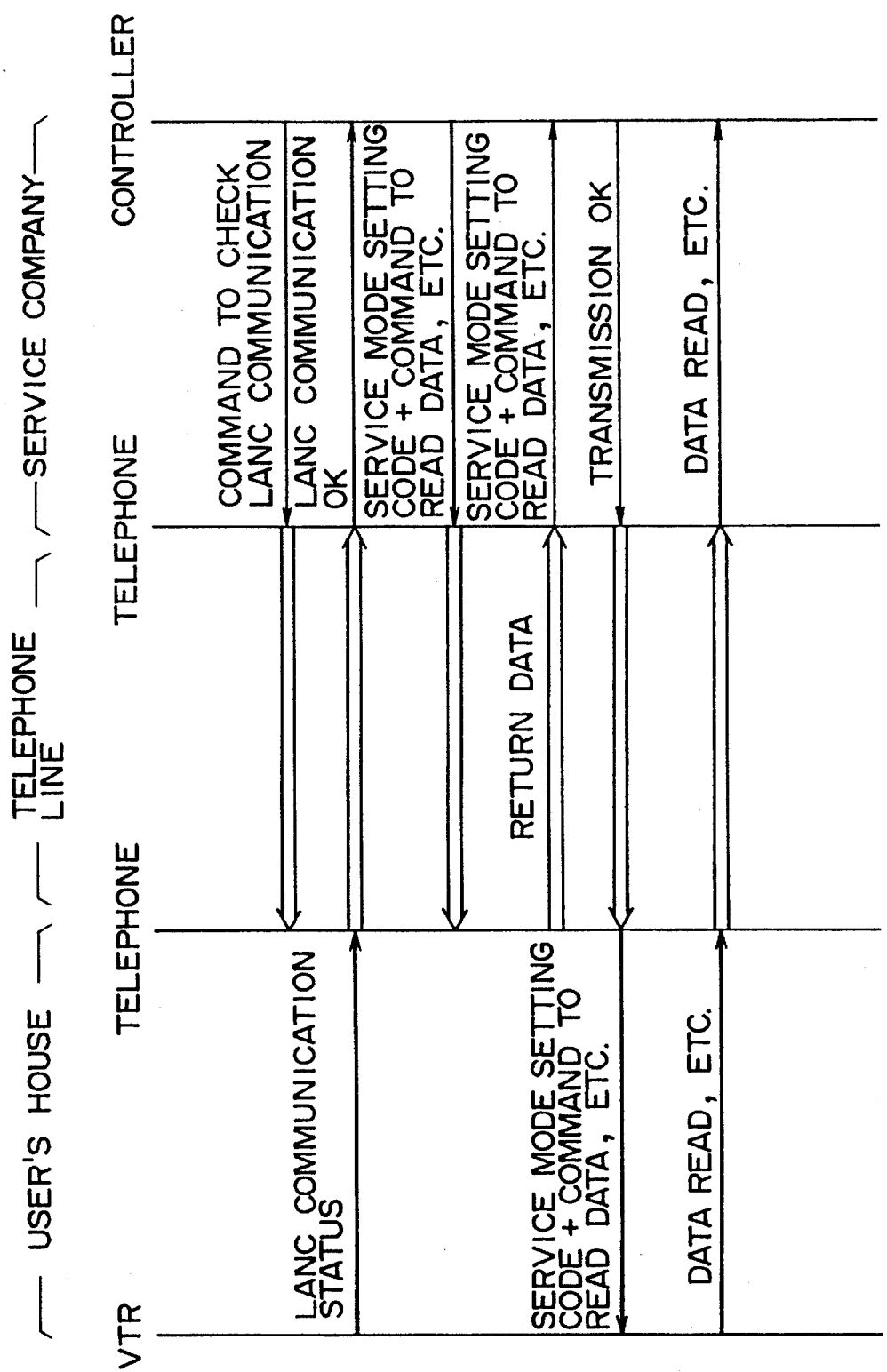
FIG. 10 is one portion of a sequence diagram showing operations in the second embodiment of the invention.
Figure 11:
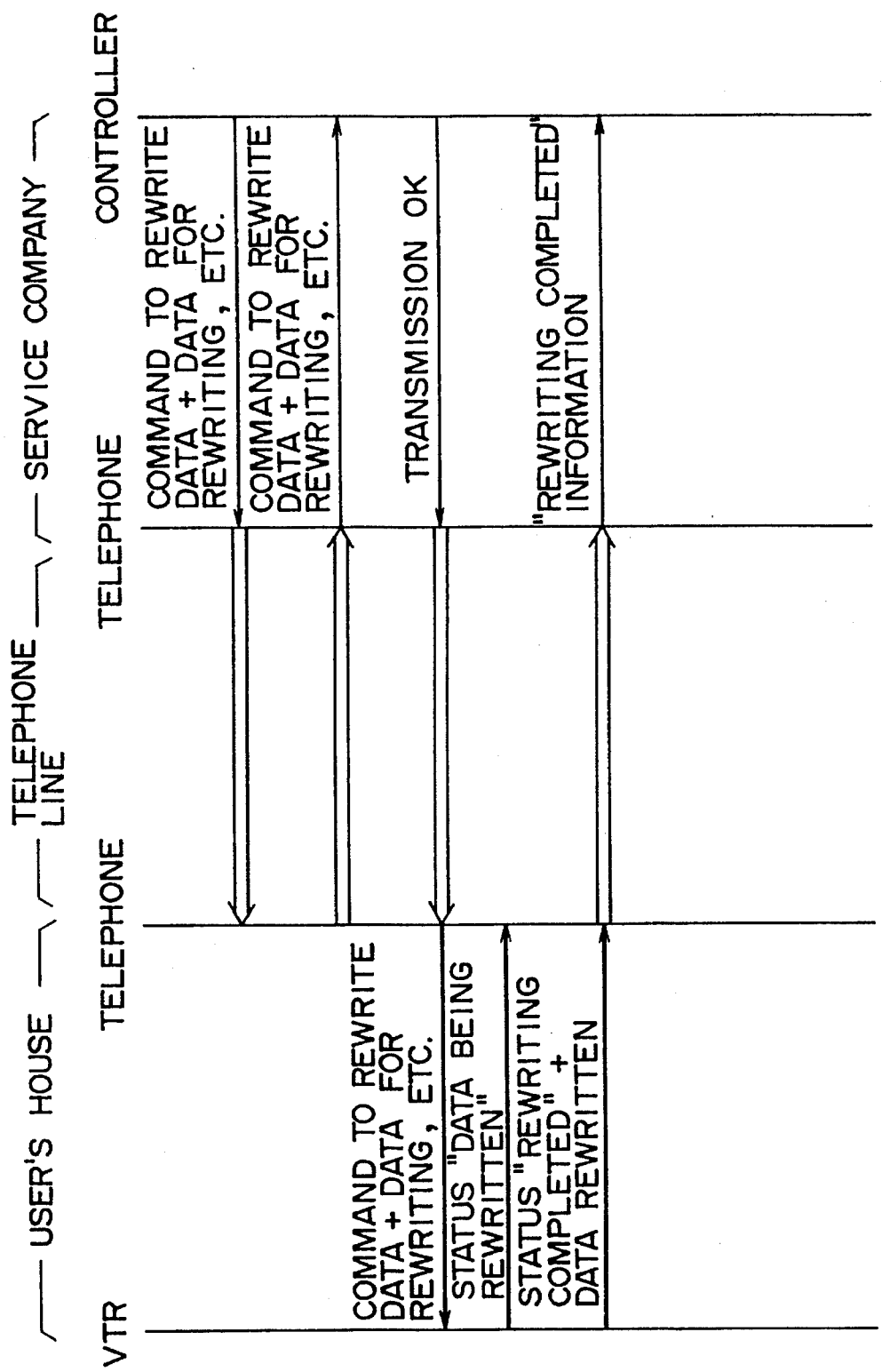
FIG. 11 is the other portion of a sequence diagram showing operations in the second embodiment of the invention.

FIG. 10 and FIG. 11 are diagrams showing a sequence of operations in the second embodiment of the invention. Referring to FIG. 10 and FIG. 11, the thin full line indicates data communication between the personal computer and the telephone, the hollow thick line indicates telephone communication, and the thick full line indicates LANC communication. The procedure to rewrite data stored in the EEPROM 13 within the VTR 1 in the checking and/or adjusting system for electronic apparatus arranged as above will be described below with reference to FIG. 7 to FIG. 11.

Now, we assume that the user gave a call to the service company and then linked the VTR 1 and the telephone with LANC terminal 9 via the LANC cable 4 as described referring to FIG. 7.

First, the service company transmits a command to check whether the LANC communication between the telephone with LANC terminal 9 and the VTR 1 in the user's house is normal by operating the keys 102 of the controller 10. This command is transmitted over the serial communication line 12 and input to the input/output interface 111 of the telephone with controller terminal 11. Therein, the command is converted into a parallel signal and input to the dialer 113 and, therein, a tone signal is generated. The tone signal generated in the dialer 113 is transmitted, through the line interface 112, over the telephone line 8 to be input to the telephone with a LANC terminal 9 in the user's house.

The tone signal input to the telephone with a LANC terminal 9 is input to the tone receiver 93 through the line interface 95 and, therein, it is converted into a 4-bit parallel digital signal and the same is input to the microcomputer 91. The microcomputer 91 judges this digital signal to be a command to check the state of the LANC communication and checks whether the communication with the VTR 1 is normal. This checking is performed by determining the presence or absence of the status transmitted from the VTR 1 the same as in the first embodiment. The microcomputer 91, according to whether the LANC communication is normal, controls the dialer 92 so that a tone signal corresponding to either state is generated and transmitted over the telephone line 8 through the line interface 95. This tone signal is converted by the tone receiver 114 of the telephone with controller terminal 11 into a 4-bit digital signal to be input to the microcomputer 101. The microcomputer 101 acknowledges whether the LANC communication is normal by discriminating the digital signal. When it is normal, the following step is processed and, when it is not normal, the checking operation is repeated until it becomes normal.

When it is confirmed that the LANC communication is normal in the described manner, then, the same as in FIG. 14, the code setting the VTR 1 to the service mode, the command to read data from the EEPROM 13, and the location (page, address, etc.) to be read are transmitted. These codes, commands, and the like are converted to tone signals in the telephone with a controller terminal 11 and input to the telephone with a LANC terminal 9 through the telephone line 8.

In the telephone with a LANC terminal 9, these tone signals are converted by the tone receiver 93 into 4-bit digital signals and input to the microcomputer 91. The microcomputer 91 stores the digital signals in its RAM (not shown) and, at the same time, controls the dialer 92 so that tone signals corresponding to the digital signals stored in the RAM are generated and sent back to the telephone with controller terminal 11 through the telephone line 8. In the telephone with controller terminal 11, the received signals are converted by the tone receiver 114 into digital signals and the digital signals are transmitted to the controller 10 through the input/output interface 111 and the serial communication cable 112. The controller 10, when the transmitted codes, commands, etc. and the sent back digital signals are in agreement, acknowledges that the codes, commands, etc. were correctly transmitted, and the following step is processed. When the transmitted commands etc. and the sent back digital signals are not in agreement, the above described checking process whether the LANC communication is normal is performed again (FIG. 10 shows the case where the LANC communication is normal).

When the transmitted codes, commands, etc. and the sent back codes, commands, etc. are confirmed to be in agreement as described above, then, the controller 10 transmits a command to the telephone with a LANC terminal 9 permitting it to transmit the earlier transmitted codes, commands, etc. to the electronic apparatus 1. Upon receipt of this command, the telephone with a LANC terminal 9 converts the codes, commands, etc. already received and stored in the RAM into LANC data and transmits them to the VTR 1.

The VTR 1, upon receipt of the codes, commands, and the like, sets the information that it is set to the service mode in the word 4, the same as in the case of FIG. 14, and, at the same time, reads data stored in the EEPROM 13 into the RAM of the microcomputer 11. Further, it reads the data from the RAM and the location read (page, address, etc.) and the data read are set in the word 5 to word 7. These mode information, data read, and the like are successively transmitted to the telephone with a LANC terminal 9. The telephone with a LANC terminal 9 receives the data and the like thus transmitted thereto, converts them into tone signals, and transmits these tone signals to the telephone with controller terminal 11 through the telephone line 8. The telephone with controller terminal 11 converts the received tone signals into digital signals and transmits the digit signals to the controller 10. The controller 10 can determine the position of failure by identifying the content of the received digital signals.

The above described sequence of communications is shown in FIG. 10. When the position of failure is determined in the described manner, then, the controller 10 transmits the data rewriting command etc. for rewriting the data in the EEPROM 13. The data rewriting command etc. are sent back after being received by the telephone with a LANC terminal 9, as with the earlier transmitted code for setting the VTR 1 in the service mode, the command to read data in the EEPROM 13, and the location (page, address, etc.) to be read. When the signals sent back are in agreement with those transmitted, then, a command permitting the data rewriting command etc. to be transmitted to the VTR 1 is transmitted. The telephone with a LANC terminal 9, upon receipt of this command, converts the data rewriting command etc. into LANC data and transmits them to the VTR 1. When the transmitted data, etc. and the sent back data, etc. are not in agreement, the data, etc. are transmitted again.

The VTR 1 sets a flag releasing the write protection the same as in the case of the first embodiment. Further, it rewrites the data on the RAM and copies them into the EEPROM 13. It sets, while rewriting the data, a status indicating that the data are being rewritten in the word 5, and when the rewriting has been completed, it sets a status indicating that the rewriting is completed. In the word 6 and word 7, there are set the data on the RAM, that is, rewritten data and the like when the rewriting has been completed. The telephone with a LANC terminal 9 receives these status and data, and compares the transmitted rewriting data etc. with the received rewritten data. If they are in agreement, it transmits a tone signal indicating the agreement to the telephone with controller terminal 11. The telephone with controller terminal 11 converts the received tone signal into a digital signal and transmits it to the controller 10. The controller 10 confirms that the rewriting of the EEPROM 13 is completed by identifying the digital signal and displays it on the display 103. Thus, the serviceman confirms that the content of the EEPROM 13 corresponding to the position of failure is rewritten. After the confirmation, the serviceman informs the user of the completion of the repair using the telephone 11.

While LANC data has been adopted as the signal to control electronic apparatus such as a VTR in each of the above described embodiments, it is not limited to the LANC data in this invention. A control signal in any format may be used provided that it can be externally input to the electronic apparatus and is capable of reading and rewriting data in its nonvolatile storage means.

Further, while each of the above described embodiments has been such a system in which the serviceman of a service company checks and repairs a VTR in a user's house, the present invention can be applied to such a system in which, for example, a designing department of a manufacturer checks and adjusts a VTR in their business department.

What is claimed is:

1. A system for performing checking and adjusting operations for electronic apparatus, comprising:

an electronic apparatus that is checked and adjusted by reading and writing data stored in storage means included therein in response to an external control signal input thereto;

a first telephone connected with said electronic apparatus for producing said external control signal;

a second telephone connected with said first telephone; and control means operatively connected to said second telephone for controlling said electronic apparatus by generating a tone signal which is received by said second telephone and transmitted by said second telephone to said first telephone for producing said external control signal fed to said electronic apparatus, wherein inputting of said external control signal to said electronic apparatus and reading of data from said storage means in said electronic apparatus are repeatedly performed in synchronism with a vertical synchronizing signal of a video signal received by said electronic apparatus from an external source.

2. The system according to claim 1, further comprising a first signal conversion means for converting a tone signal into a digital signal connected between said electronic apparatus and said first telephone.

3. The system according to claim 2, wherein said electronic apparatus includes a microcomputer and a first input/output interface receiving an output signal from said first signal conversion means and supplying the output signal to said microcomputer and to said storage means through said microcomputer.

4. The system according to claim 2, wherein said electronic apparatus includes a microcomputer and a video signal processor, whereby the state of said video signal processor is written into said storage means by means of said microcomputer.

5. The system according to claim 4, wherein said first signal conversion means has a second input/output interface for exchanging signals with said first input/output interface of said electronic apparatus and a second microcomputer connected to the second input/output interface for controlling these signals.

6. The system according to claim 5, wherein said first telephone includes a dialer, a tone receiver, and a first line interface and exchanges signals with said second microcomputer in said first signal conversion means through said dialer and said tone receiver.

7. The system according to claim 6, wherein said second telephone includes a second line interface, an earphone, and a microphone, and is coupled with said control means through said earphone and microphone for controlling said electronic apparatus.

8. The system according to claim 7, wherein said control means includes a third input/output interface for exchanging signals with said second line interface, a third microcomputer for exchanging signals with said second line interface through said third input-output interface, display means for displaying a state of controlling, and a keyboard for keying in data to said third microcomputer.

9. A system for performing checking and adjusting operations for electronic apparatus comprising:

an electronic apparatus that is checked and adjusted by reading and rewriting data stored in storage means included therein in response to an external control signal supplied thereto;

a first telephone connected with said electronic apparatus for supplying said external control signal;

a second telephone connected with said first telephone; and control means operatively connected to said second telephone for generating a tone signal which is received by said second telephone and transmitted to said first telephone for producing said external control signal fed to said electronic apparatus, wherein inputting of said external control signal to said electronic apparatus and reading of data from said storage means in said electronic apparatus are repeatedly performed in synchronism with a vertical synchronizing signal of a video signal received by said electronic apparatus from an external source.

10. The system according to claim 9, further comprising a first signal conversion means for converting a tone signal into a digital signal connected between said electronic apparatus and said first telephone.

11. The system according to claim 10, wherein said electronic apparatus includes a microcomputer and a first input/output interface receiving an output signal from said first signal conversion means and supplying the output signal to said microcomputer and to said storage means through said microcomputer.

12. The system according to claim 10, wherein said electronic apparatus includes a microcomputer and a video signal processor, whereby the state of said video signal processor is written into said storage means by means of said microcomputer.

13. The system according to claim 12, wherein said first signal conversion means has a second input/output interface for exchanging signals with said first input/output interface of said electronic apparatus and a second microcomputer connected to the second input/output interface for controlling these signals.

14. The system according to claim 13, wherein said first telephone includes a dialer, a tone receiver, and a first line interface and exchanges signals with said second microcomputer in said first signal conversion means through said dialer and said tone receiver.

15. The system according to claim 14, wherein said second telephone includes a second line interface, an earphone, and a microphone, and is coupled with said control means through said earphone and said microphone for controlling said electronic apparatus.

16. The system according to claim 15, wherein said control means includes a third input/output interface for exchanging signals with said second line interface, a third microcomputer for exchanging signals with said second line interface through said third input/output interface, display means for displaying a state of controlling, and a keyboard for keying data into said third microcomputer.

* * * * *